United States Patent
McCaffrey et al.

(10) Patent No.: US 12,404,806 B2
(45) Date of Patent: Sep. 2, 2025

(54) HIGH PRESSURE TURBINE DIRT BLOCKER

(71) Applicant: Raytheon Technologies Corporation, Farmington, CT (US)

(72) Inventors: Michael G. McCaffrey, Windsor, CT (US); Christopher King, Terryville, CT (US)

(73) Assignee: RTX Corporation, Farmington, CT (US)

( * ) Notice: Subject to any disclaimer, the term of this patent is extended or adjusted under 35 U.S.C. 154(b) by 117 days.

(21) Appl. No.: 17/551,685

(22) Filed: Dec. 15, 2021

(65) Prior Publication Data

US 2023/0184139 A1    Jun. 15, 2023

(51) Int. Cl.
*F02C 7/052* (2006.01)
*B01D 45/08* (2006.01)
*F01D 25/32* (2006.01)

(52) U.S. Cl.
CPC .............. *F02C 7/052* (2013.01); *B01D 45/08* (2013.01); *F01D 25/32* (2013.01); *F05D 2260/607* (2013.01)

(58) Field of Classification Search
CPC ............................ F02C 7/052; F05D 2260/607
See application file for complete search history.

(56) References Cited

U.S. PATENT DOCUMENTS

| | | | |
|---|---|---|---|
| 7,137,777 B2 | 11/2006 | Fried et al. | |
| 7,770,375 B2 | 8/2010 | Alvanos et al. | |
| 8,240,121 B2 * | 8/2012 | Hazzard | F01D 25/00 55/306 |
| 8,943,791 B2 | 2/2015 | Tibbott et al. | |
| 10,113,486 B2 | 10/2018 | Mueller et al. | |
| 11,015,469 B2 * | 5/2021 | Saddawi | F01D 25/12 |
| 2021/0047953 A1 * | 2/2021 | Gover | F02M 23/14 |
| 2021/0047965 A1 * | 2/2021 | Barberger | F02C 7/12 |

FOREIGN PATENT DOCUMENTS

| | | |
|---|---|---|
| EP | 1413714 A2 | 4/2004 |
| EP | 3409907 A1 | 12/2018 |

OTHER PUBLICATIONS

European Search Report dated Jun. 19, 2023 issued in counterpart EP Application No. 22212774.8.

* cited by examiner

*Primary Examiner* — Lorne E Meade
*Assistant Examiner* — Alyson Joan Harrington
(74) *Attorney, Agent, or Firm* — Bachman & LaPointe, P.C.

(57) ABSTRACT

A dirt blocker including a support structure disposed within a gas turbine engine, the support structure defining an upstream control volume proximate a forward portion of the gas turbine engine and a downstream control volume proximate an aft portion of the gas turbine engine, the downstream control volume being opposite the upstream control volume relative to the support structure, a flow passage formed through the support structure, the flow passage configured to fluidly couple the upstream control volume with the downstream control volume; a radial contact wall formed from the support structure in fluid communication with the upstream control volume, the radial contact wall configured to intercept debris entrained within cooling air within the gas turbine engine; and a stagnation zone fluidly coupled with the flow passage, the stagnation zone configured to reduce momentum of the debris.

8 Claims, 7 Drawing Sheets

HIGH PRESSURE TURBINE DIRT BLOCKER

BACKGROUND

The present disclosure is directed to a system for entrapping entrained debris in the cooling air of a gas turbine engine.

Gas turbine engines are provided with a number of functional sections, including a fan section, a compressor section, a combustion section, and a turbine section. Air and fuel are combusted in the combustion section. The products of the combustion move downstream, and pass over a series of turbine rotors, driving the rotors to provide power.

Numerous components within the gas turbine engine are subject to high levels of heat during operation. As an example, a turbine rotor will have a plurality of turbine blades that are driven by high temperature products of combustion to rotate and create the power. Cooling fluid, and typically air, is passed within a body of the turbine blades, seals, and vanes to cool the components.

The air passing through a gas turbine engine is often subjected to dirt and other impurities. It is desirable that the air utilized for cooling various components be relatively clean. The cooling of the components is through relatively small passages, and the dirt and impurities can clog those small passages.

What is needed is a system that blocks and entrains the dirt to prevent clogging.

SUMMARY

In accordance with the present disclosure, there is provided a dirt blocker comprising a support structure disposed within a gas turbine engine, the support structure defining an upstream control volume proximate a forward portion of the gas turbine engine and a downstream control volume proximate an aft portion of the gas turbine engine, the downstream control volume being opposite the upstream control volume relative to the support structure, a flow passage formed through the support structure, the flow passage configured to fluidly couple the upstream control volume with the downstream control volume; a radial contact wall extending from the support structure in fluid communication with the upstream control volume, the radial contact wall configured to intercept debris entrained within cooling air within the gas turbine engine; and a stagnation zone fluidly coupled with the flow passage, the stagnation zone configured to reduce momentum of the debris.

A further embodiment of any of the foregoing embodiments may additionally and/or alternatively include the dirt blocker further comprising a debris wall coupled to the support structure proximate an upstream side, the debris wall being fluidly coupled to a bore formed between the radial contact wall and the debris wall, the bore in fluid communication with the flow passage.

A further embodiment of any of the foregoing embodiments may additionally and/or alternatively include the dirt blocker further comprising an aft facing slot in fluid communication with the bore.

A further embodiment of any of the foregoing embodiments may additionally and/or alternatively include the aft facing slot is fluidly coupled with the stagnation zone.

A further embodiment of any of the foregoing embodiments may additionally and/or alternatively include the dirt blocker further comprising an impingement wall coupled to the support structure at a downstream side, the impingement wall configured to intercept debris entrained in the cooling air.

A further embodiment of any of the foregoing embodiments may additionally and/or alternatively include the impingement wall intersects a centerline of the flow passage, where cooling air flow discharging the flow passage impinges the impingement wall.

A further embodiment of any of the foregoing embodiments may additionally and/or alternatively include the support structure is disposed within a portion of a high pressure turbine section.

In accordance with the present disclosure, there is provided a dirt blocker for a high pressure turbine comprising a support structure disposed within the high pressure turbine, the support structure defining an upstream control volume proximate a forward portion of the high pressure turbine and a downstream control volume proximate an aft portion of the high pressure turbine, the downstream control volume being opposite the upstream control volume relative to the support structure; a flow passage formed through the support structure, the flow passage configured to fluidly couple the upstream control volume with the downstream control volume; a radial contact wall unitary with the support structure in fluid communication with the upstream control volume, the radial contact wall configured to intercept debris entrained within cooling air within the gas turbine engine; and a stagnation zone fluidly coupled with the flow passage, the stagnation zone configured to reduce momentum of the debris.

A further embodiment of any of the foregoing embodiments may additionally and/or alternatively include the dirt blocker for a high pressure turbine further comprising a debris wall formed from the support structure proximate an upstream side, the debris wall being fluidly coupled to a bore formed between the radial contact wall and the debris wall, the bore in fluid communication with the flow passage.

A further embodiment of any of the foregoing embodiments may additionally and/or alternatively include the dirt blocker for a high pressure turbine further comprising an impingement wall coupled to the support structure at a downstream side, the impingement wall configured to intercept debris entrained in the cooling air.

A further embodiment of any of the foregoing embodiments may additionally and/or alternatively include the impingement wall intersects a centerline of the flow passage, wherein cooling air flow discharging the flow passage impinges the impingement wall.

A further embodiment of any of the foregoing embodiments may additionally and/or alternatively include the impingement wall comprises multiple, discrete arc segments, individually aligned with the centerline.

A further embodiment of any of the foregoing embodiments may additionally and/or alternatively include the stagnation zone is located in either the upstream control volume or the downstream control volume.

In accordance with the present disclosure, there is provided a process for removing debris entrained in a gas turbine engine cooling air flow comprising flowing cooling air through the gas turbine engine; bisecting a portion of the gas turbine engine with a support structure disposed within the gas turbine engine, the support structure defining an upstream control volume proximate a forward portion of the gas turbine engine and a downstream control volume proximate an aft portion of the gas turbine engine, the downstream control volume being opposite the upstream control volume relative to the support structure; forming a flow passage through the support structure, the flow passage configured to fluidly couple the upstream control volume with the downstream control volume; forming a radial contact wall unitary with the support structure in fluid communication with the upstream control volume, the radial contact wall configured to intercept debris entrained within cooling air within the high pressure turbine; and forming a stagnation zone fluidly coupled with the flow passage, the stagnation zone configured to reduce momentum of the debris.

A further embodiment of any of the foregoing embodiments may additionally and/or alternatively include the process further comprising forming a debris wall unitary with the support structure proximate an upstream side; and fluidly coupling the debris wall to a bore formed between the radial contact wall and the debris wall, the bore in fluid communication with the flow passage.

A further embodiment of any of the foregoing embodiments may additionally and/or alternatively include the process further comprising an impingement wall coupled to the support structure at a downstream side; and intercepting debris entrained in the cooling air with the impingement wall.

A further embodiment of any of the foregoing embodiments may additionally and/or alternatively include the process wherein the impingement wall intersects a centerline of the flow passage, wherein cooling air flow discharging the flow passage impinges the impingement wall.

A further embodiment of any of the foregoing embodiments may additionally and/or alternatively include the process further comprising locating the stagnation zone in the upstream control volume.

A further embodiment of any of the foregoing embodiments may additionally and/or alternatively include the process further comprising locating the stagnation zone in the downstream control volume.

A further embodiment of any of the foregoing embodiments may additionally and/or alternatively include the process further comprising forming raised features as extended material raised from the upstream side of the support structure adjacent to the flow passage.

Other details of the dirt blocker are set forth in the following detailed description and the accompanying drawings wherein like reference numerals depict like elements.

DETAILED DESCRIPTION

Figure 1:
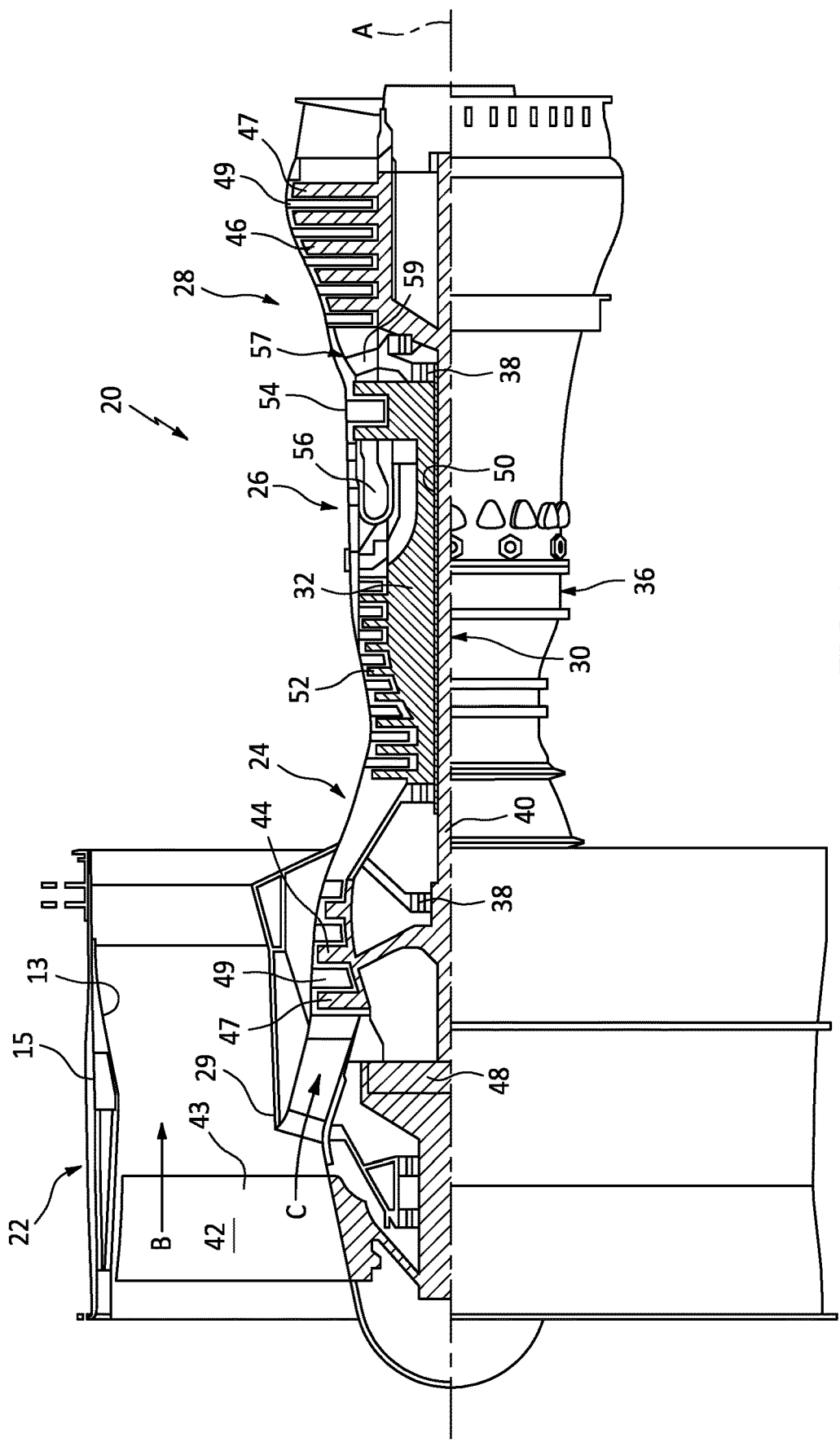
FIG. 1 is a schematic longitudinal sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft. (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a span-wise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "Low corrected fan tip speed" is the actual fan tip speed in feet/second divided by an industry standard temperature correction of $[(Tram\ °\ R)/(518.7°\ R)]^{0.5}$. The "low corrected fan tip speed" can be less than or equal to 1150.0 feet/second (350.5 meters/second), and greater than or equal to 1000.0 feet/second (304.8 meters/second).

Figure 2:
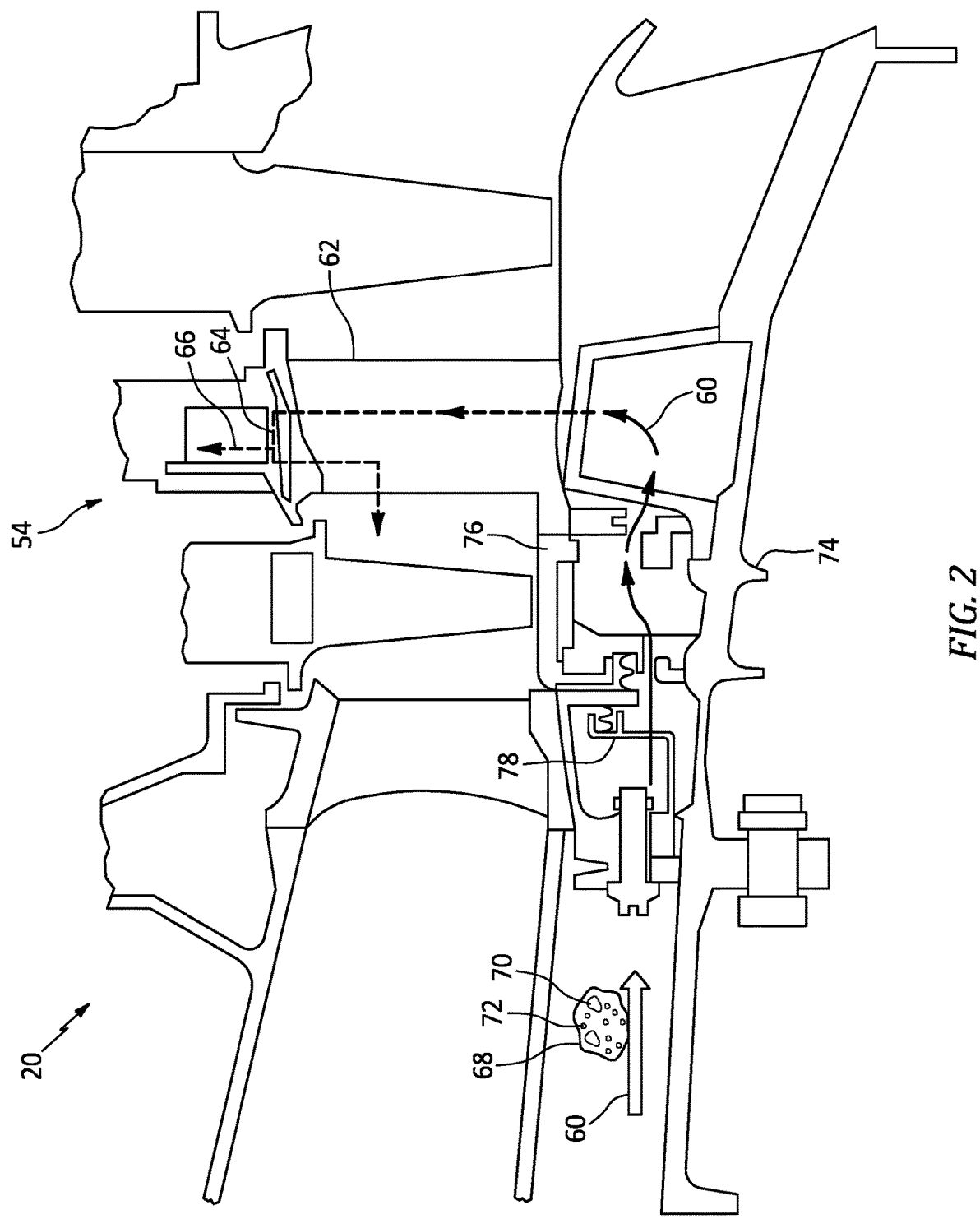
FIG. 2 is a schematic longitudinal sectional view of a portion of the gas turbine engine.

Referring also to FIG. 2, details of the cooling air flow through portions of the high pressure turbine structure are shown. Cooling air 60 is shown as line with arrows and dashed lines following a flow path through the various internal components of the gas turbine engine 20. As the cooling air 60 passes through the vane 62, the cooling air 60 follows several sharp turns around corners. A dirt purge hole 64 can be located in the vane 62 such that the purged air 66 exits at a location between corners and turns. Debris particles 68 are transported within the cooling air 60. The large particles 70 and small particles 72 can pass through the relatively large openings in the components. However the large particles 70 can clog certain cooling holes in the components, such as vane cooling holes. Small particles can fill the vane 62 as they become entrapped. The heavier large particles 70 require higher flow rates and velocities to remain being transported. The location of the purge hole 64 in the vane 62 leads to inefficient debris 68 removal. The multiple turns, low Mach number flow, and purge hole 64 location at an angle normal to the cooling air 60 flow direction contributes to the poor removal capability.

Figure 3:
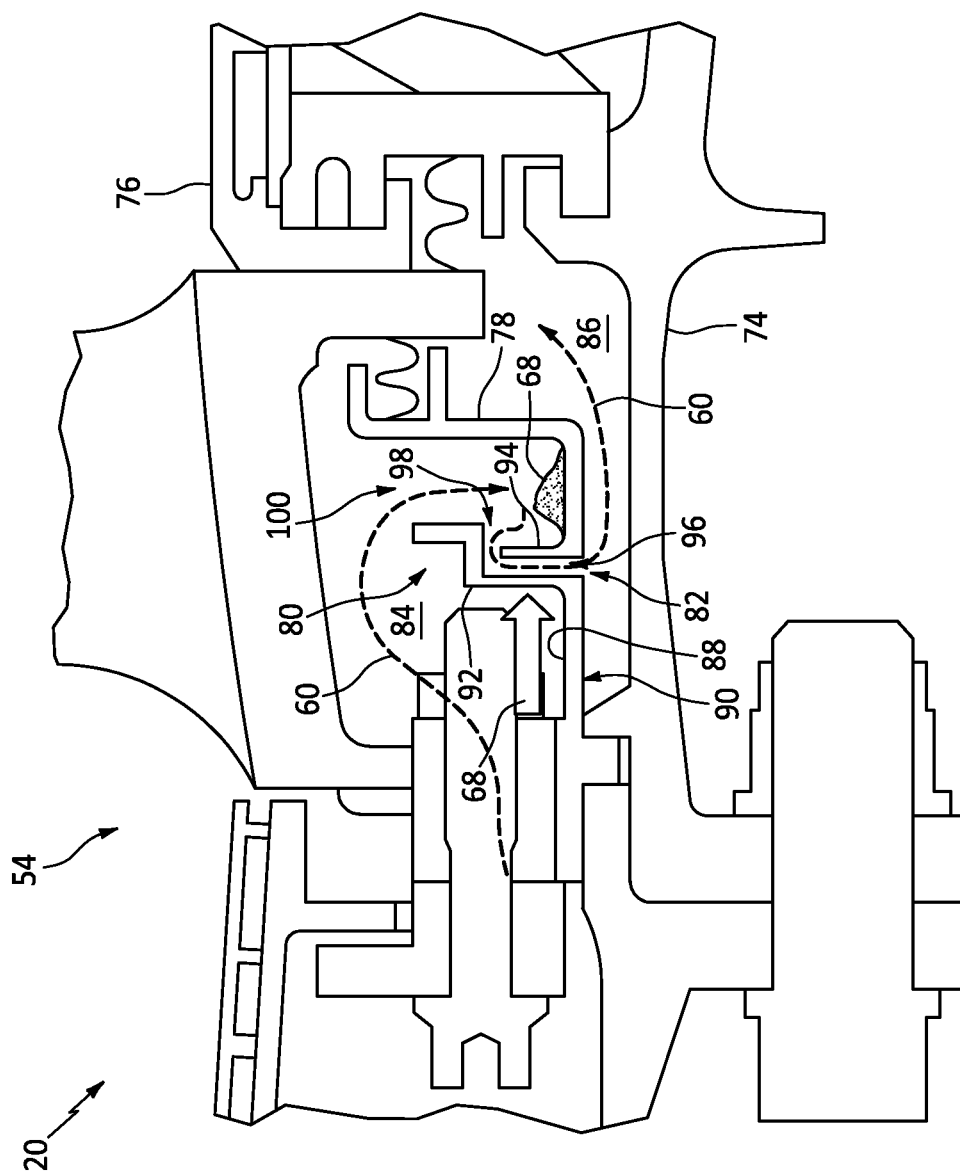
FIG. 3 is a schematic longitudinal sectional view of a portion of the gas turbine engine with dirt blocker feature.

Referring also to FIG. 3, an enlarged view of a portion of the high pressure turbine section 54 is shown. The cooling air 60 is shown flowing proximate the case 74 and the air seal 76. A portion of the support structure 78 is shown with a dirt blocker 80 feature. The support structure 78 can be a part of the supports for the air seals, an extension of the case 74 or other component projection that bisects the cooling air 60 flow as it passes through gas turbine engine 20. In an exemplary embodiment, the support structure is a wall that creates a pressure difference from one side to another. It is required for the flow metering holes 82 to function. Essentially, support structure 78 is the distinguishing physical boundary that creates the two control volumes, 84 and 86. It is a pressure vessel.

Figure 4:
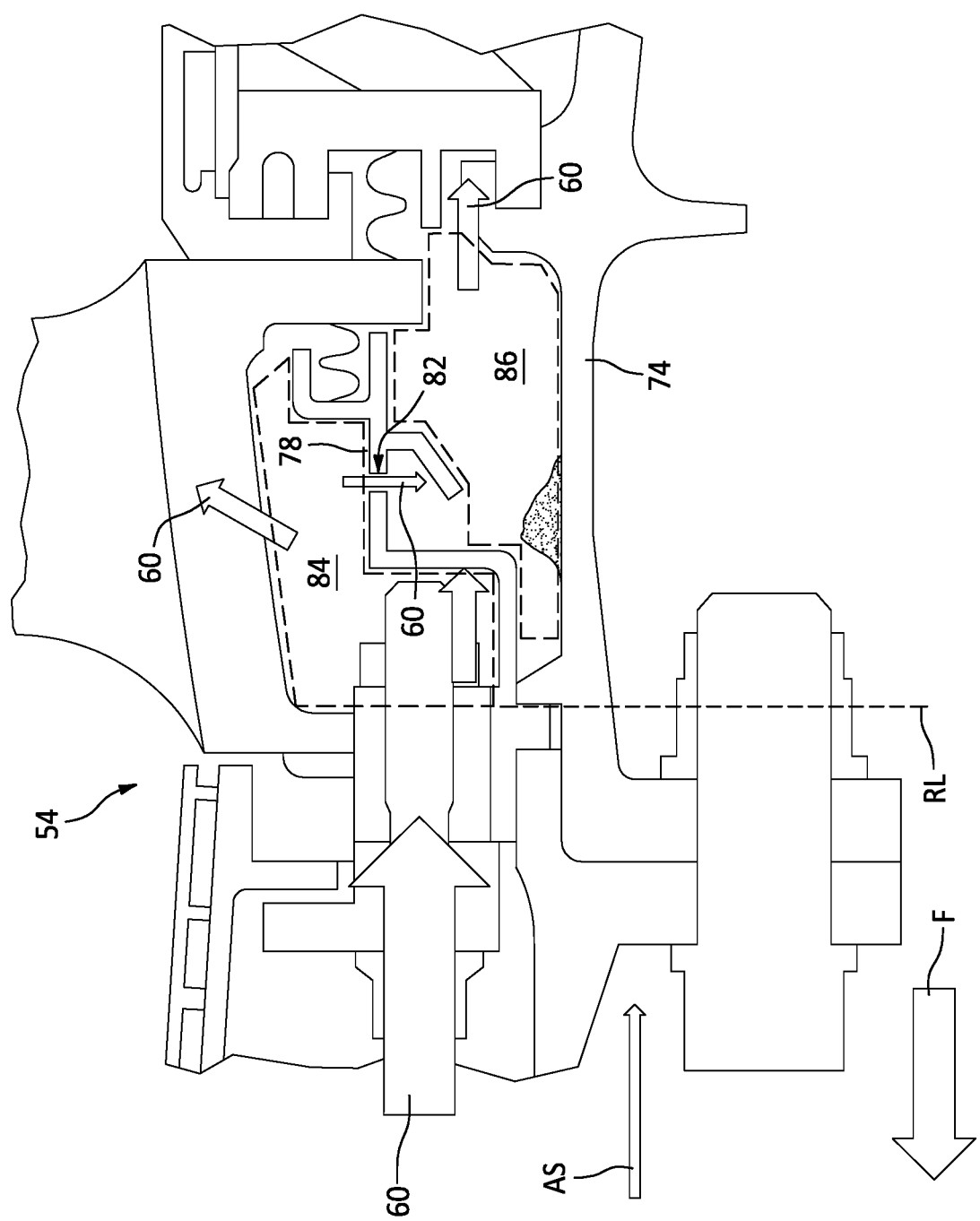
FIG. 4 is a schematic longitudinal sectional view of a portion of the gas turbine engine with cooling air control volumes.

Referring also to FIG. 4, the cooling air 60 is shown schematically, as a bulk air flow from the front F of the flowpath 60 to the aft rear cavities to cool the high pressure turbine 54 components. The dirt blocker 80 feature in the support structure 78 is in fluid communication with and can bisect the cooling air 60 into an upstream control volume region 84 and a downstream control volume region 86. An axial station AS can be started from a reference location RL. The upstream control volume 84 can have a high static pressure with very low velocity and Mach number of from about 0.01 to about 0.1. The downstream control volume 86 can have a lower static pressure, very low velocity and Mach number of from about 0.01 to about 0.1. A large percentage of the upstream control volume region 84 can pass to cool the vane 62. The relative pressures between the two regions can be understood as a static pressure at the downstream control volume to be about 50%-90% of the upstream control volume static pressure.

Referring to FIG. 3, the dirt blocker feature 80 can be configured with a flow passage 82 formed in the support structure 78. The flow passage 82 can be a radially (relative to the axis A) drilled hole in the support structure 78. The support structure 78 divides the upstream control volume 84 side 88 of the structure 78 from the downstream control volume 86 side 90 of the structure 78, such that the cooling air 60 can pass through the flow passage 82 and be in fluid communication. The flow passage 82 can be sized to accelerate the cooling air 60 and entrained debris 68. The debris 68 entrained in the cooling air 60 can be given momentum sufficient to be propelled and ricochet.

A first wall or simply a radial contact wall 92 extends radially inward from the support structure 78 on the upstream side 88 and proximate the front F adjacent to the flow passage 82. The radial contact wall 92 can be unitary (integral) with the support structure 78. The radial contact wall 92 creates a physical barrier configured to intercept debris 68 and cause impact and reflection (by ricochet) of the first wall 92. Since the radial contact wall 92 is forward of the flow passage 82, the radial contact wall 92 receives the initial impact of the debris 68 in the cooling air 60 flow proximate the flow passage 82. The cooling air 60 flow is forced to flow over the radial contact wall 92, as depicted by the dashed arrow line. The large particles 70 entrained in the cooling air 60 are also forced to impact the radial contact wall 92. Smaller particles 72 can follow the cooling air 60 flow over the radial contact wall 92.

A second wall or simply debris wall 94 extends radially inward from the support structure 78 on the upstream side 88 and aft and adjacent to the flow passage 82 opposite from the radial contact wall 92. In an alternative embodiment, the first wall 92 and second wall 94 can be a unitary wall with a bore 96 formed to fluidly communicate with the flow passage 82.

An aft facing slot 98 is formed between the first wall 92 and the second wall 94. The aft facing slot 98 can be elevated a predetermined distance above the support structure 78 to allow for the accumulation of debris 68 and maintain the slot 98 open to receive cooling air 60 flow. The aft facing slot 98 is situated such that the cooling air 60 flow has to change direction and decelerate. The aft facing slot 98 can be located proximate to a stagnation zone 100 formed by the dirt blocker 80 and the support structure 78. The stagnation zone 100 can be a location within the upstream control volume 84 (or downstream control volume 86) proximate the dirt blocker 80 that creates flow deceleration and swirling such that the debris 68 loses momentum and falls out of the cooling air 60 flow and deposits and/or accumulates. The stagnation zone 100 allows for the removal of debris 68 from the cooling air 60 flow.

As seen in FIG. 3 the cooling air 60 can pass through the slot 98 and bore 96 past the flow passage 82 in fluid communication from the upstream control volume 84 into the downstream control volume 86. The cooling air 60 can flow to the aft sections with less debris 68 entrained within the cooling air 60.

Figure 5:
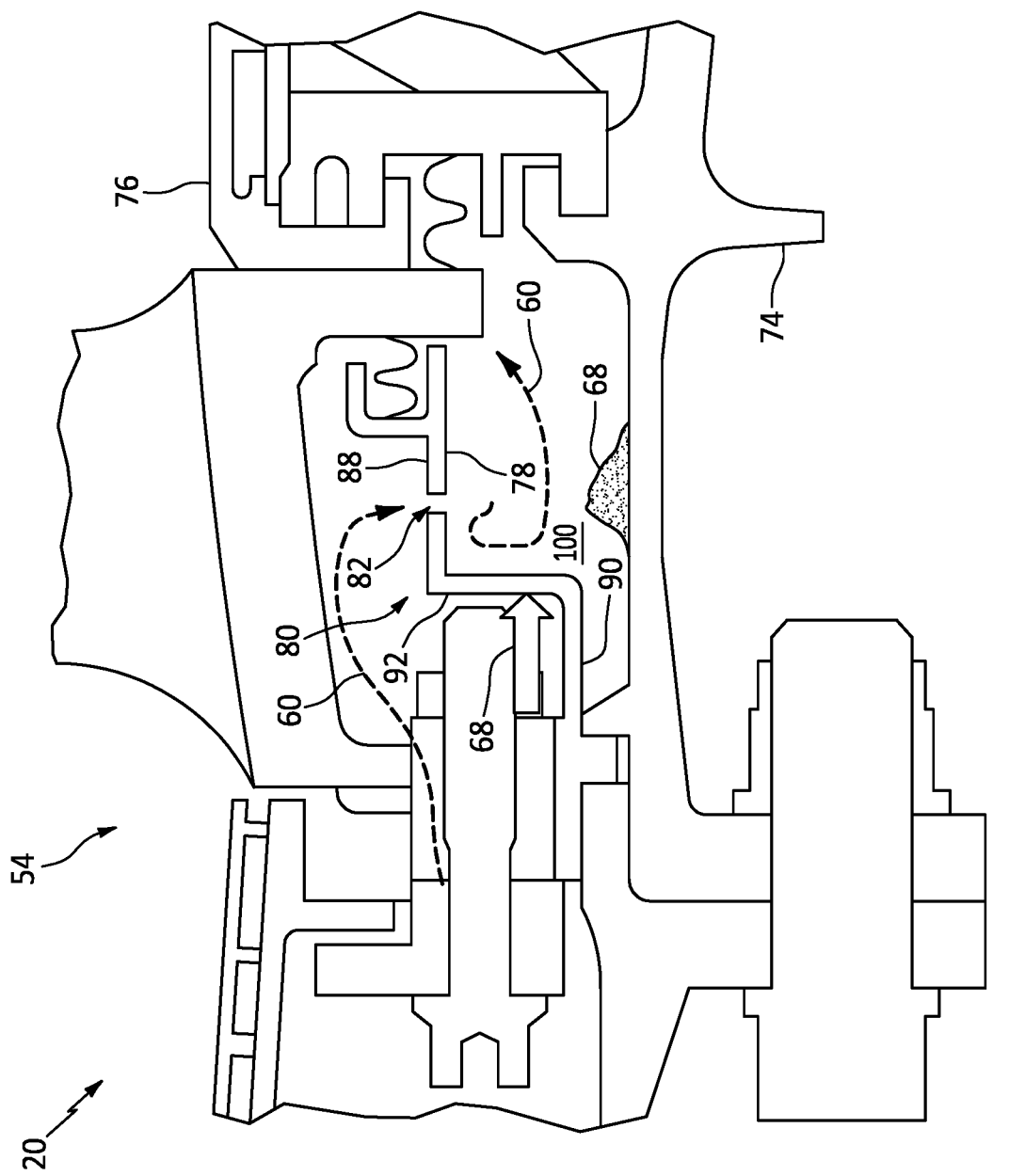
FIG. 5 is a schematic longitudinal sectional view of a portion of the gas turbine engine with dirt blocker feature.

Referring also to FIG. 5, an exemplary embodiment of the dirt blocker 80 is shown. The dirt blocker 80 can be formed unitary with the support structure 78. As shown in the other figures, the support structure 78 separates the upstream control volume 84 and downstream control volume 86. The cooling air 60 is in fluid communication with and passes from the upstream control volume 84 through the flow passage 82 into the downstream control volume 86. The dirt blocker 80 can be configured from a portion of the support structure 78 being formed as a radial contact wall 92. The radial contact wall 92 can include a radial orientation relative to the axis A, such that debris 68, particularly, large particles 70 impinge upon the radial contact wall 92, lose momentum and drop out of the cooling air 60 flow within the upstream control volume 84. The flow passage 82 is formed in the support structure 78, and can be a radially drilled hole (relative to the axis A). The flow passage 82 can be sized to meter the cooling air 60 flow through the support structure 78. The flow passage can include a predetermined size, for example a size that accelerates the cooling air 60 through the flow passage 82 at a value of from 0.5 Mach number at the upstream control volume 84 to about 1.0 Mach number at the downstream control volume 86.

The stagnation zone 100 can be located in the downstream control volume 86 side of the support structure 78 proximate the discharge of the flow passage 82. The stagnation zone 100 can be in fluid communication with the flow passage 82. The debris 68 that managed to pass through the flow passage 82 and enters the stagnation zone 100 can lose momentum and fall out of the cooling air 60 flow to settle on the case wall 74 as shown. The cooling air 60 can flow to the aft sections without the debris 68.

Figure 6:
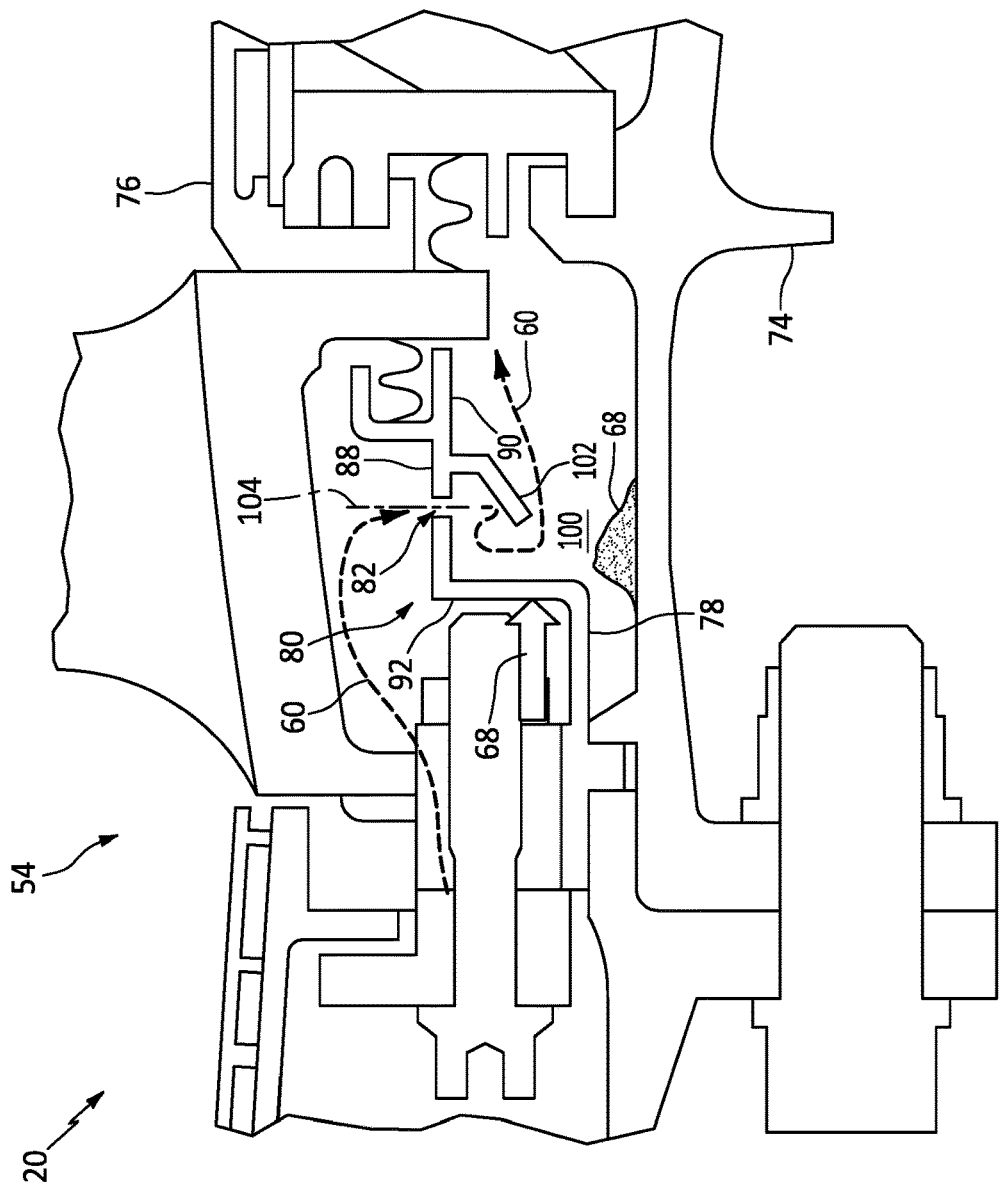
FIG. 6 is a schematic longitudinal sectional view of a portion of the gas turbine engine with dirt blocker feature.

Referring also to FIG. 6, an exemplary embodiment of the dirt blocker 80 is shown. The dirt blocker 80 can include an impingement wall 102. The impingement wall 102 can extend from or be attached to the support structure 78 on the downstream side of the support structure 78. The impingement wall 102 can extend proximate the flow passage 82. The impingement wall 102 can extend across a centerline 104 of the flow passage 82 such that cooling flow 60 exiting the flow passage on the downstream side 90 of the support structure 78, is forced to impinge the impingement wall 102 to transfer momentum, and change direction from along the centerline 104 to another direction. In an exemplary embodiment, the impingement wall 102 can be multiple, discrete arc segments, individually aligned with the centerline 104, creating multiple secondary stagnation zones 100, within the control volume 86.

The impingement wall 102 is configured to receive debris 68 that is entrained in the cooling air 60 flow exiting the flow passage 82. The debris 68 that impinges on the impingement wall 102 can be redirected, (ricochet) by the impingement wall 102 and lose momentum. As seen at FIG. 6 the cooling air 60 and entrained debris 68 can be redirected to contact the support structure 78 and lose momentum. The cooling air 60 and entrained debris 68 can be redirected by the impingement wall 102 to contact the downstream side 90 of the support structure 78. The cooling air 60 and entrained debris 68 can be redirected by the impingement wall 102 to contact the first wall 92 on the downstream side 90 of the support structure 78.

The impingement wall 102 can be configured to redirect the cooling air 60 flow to the stagnation zone 100. Multiple ricochets of the debris 68 dissipate the transport energy of the debris 68. With the momentum and velocity of the debris 68 entrained in the cooling air 60 flow being diminished, the transport mechanism of the debris 68 can be diminished such that the debris 68 can no longer be supported by aerodynamic drag and the debris 68 can drop out of the cooling air 60 flow path. As the debris 68 drops out of the cooling air 60 flow path, the debris 68 can settle on the interior of the case 74 in a location that is low risk, as shown.

Figure 7:
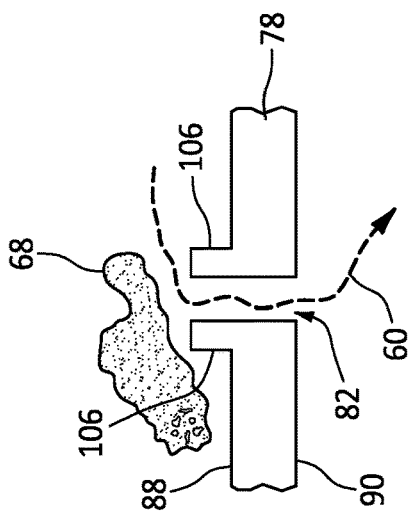
FIG. 7 illustrates an enlarged view of an exemplary flow passage.

FIG. 7 illustrates an enlarged view of the flow passage 82 as previously described. The support structure 78 can include raised features 106. The raised features 106 can include extended material raised from the upstream side 88 of the support structure 78 adjacent to the flow passage 82. The raised features 106 can be configured to prevent debris 68 from clogging the flow passage 82. In an exemplary embodiment, the raised features 106 can be a slotted raised edge of the flow passage 82.

Figure 8:
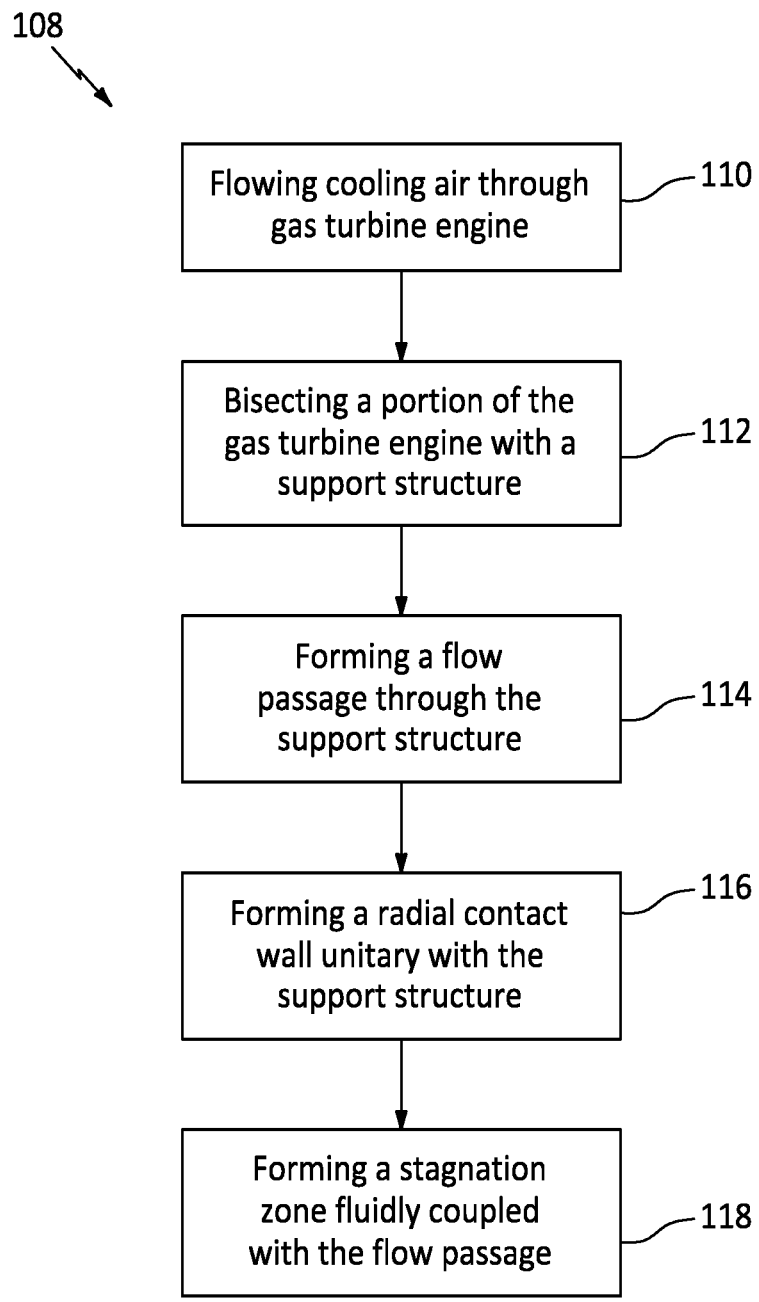
FIG. 8 illustrates a process map of an exemplary process.

Referring also to FIG. 8 a process flow diagram of the exemplary embodiment is shown. A process 108 for removing debris entrained in a gas turbine engine cooling air flow is described. The process at step 110 includes flowing cooling air through the gas turbine engine. The process at step 112 includes bisecting a portion of the gas turbine engine with a support structure disposed within the gas turbine engine. The support structure can define an upstream control volume proximate a forward portion of the gas turbine engine and a downstream control volume proximate an aft portion of the gas turbine engine. The downstream control volume being opposite the upstream control volume relative to the support structure. The process can include the step 114 of forming a flow passage through the support structure. The flow passage can be configured to fluidly couple the upstream control volume with the downstream control volume. The process can include the step 116 of forming a radial contact wall unitary with the support structure in fluid communication with the upstream control volume. The radial contact wall can be configured to intercept debris entrained within cooling air within the gas turbine engine. The process can include the step 118 of forming a stagnation zone fluidly coupled with the flow passage. The stagnation zone can be configured to reduce momentum of the debris.

A technical advantage of the disclosed dirt blocker includes reducing cooling hole plugging from debris.

Another technical advantage of the disclosed dirt blocker includes forming the dirt blocker by integration of walls and flow passages designed to remove entrained debris from the cooling air.

Another technical advantage of the disclosed dirt blocker includes a solution based upon physical behaviors of debris, dirt and dust.

Another technical advantage of the disclosed dirt blocker includes the use of walls, turning, impingement barriers and stagnation zones to create multiple places where debris can be blocked.

There has been provided a dirt blocker. While the dirt blocker has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A dirt blocker comprising:
   a support structure disposed within a gas turbine engine, the gas turbine engine having a central longitudinal axis and comprising a high pressure turbine stage including a high pressure turbine stage vane axially forward of a high pressure turbine stage blade, the support structure disposed radially outward with respect to the central longitudinal axis from the high pressure turbine stage vane, axially aligned with the high pressure turbine stage vane and axially forward of the high pressure turbine stage blade, said support structure defining and dividing an upstream control volume and a downstream control volume, said downstream control volume being opposite said upstream control volume relative to said support structure, wherein upstream and downstream are with respect to cooling air flow direction;
   a flow passage formed radially through an axially extending portion of said support structure, said flow passage formed between and configured to fluidly couple said upstream control volume with said downstream control volume, all of said upstream control volume being upstream of the flow passage, all of the downstream control volume being downstream of the flow passage;
   a radial contact wall extending from said support structure within said upstream control volume upstream of the flow passage, said radial contact wall configured to intercept debris entrained within cooling air within said upstream control volume upstream of the flow passage; and
   a stagnation zone within said upstream control volume fluidly coupled with said flow passage, the stagnation zone being upstream of the flow passage and axially aft of the flow passage, said stagnation zone configured to reduce momentum of said debris upstream of the flow passage.

2. The dirt blocker according to claim 1, further comprising:
   a debris wall coupled to said support structure proximate an upstream side, the debris wall being upstream of the flow passage, said debris wall being fluidly coupled to a bore formed between said radial contact wall and said debris wall, said bore in fluid communication with said flow passage.

3. The dirt blocker according to claim 2, further comprising an aft facing slot in fluid communication with said bore, the aft facing slot located upstream of the flow passage.

4. The dirt blocker according to claim 3, wherein said aft facing slot is fluidly coupled with said stagnation zone.

5. A dirt blocker for a high pressure turbine comprising:
   a support structure disposed within said high pressure turbine, said high pressure turbine having a central longitudinal axis and comprising a high pressure turbine stage including a high pressure turbine stage vane axially forward of a high pressure turbine stage blade, the support structure disposed radially outward with respect to the central longitudinal axis from the high pressure turbine stage vane, axially aligned with the high pressure turbine stage vane and axially forward of the high pressure turbine stage blade, said support structure defining an upstream control volume and a downstream control volume, said downstream control volume being opposite said upstream control volume relative to said support structure, said support structure dividing the upstream control volume from the downstream control volume, wherein upstream and downstream are with respect to cooling air flow direction;
   a flow passage formed radially through an axially extending portion of said support structure, said flow passage configured to fluidly couple said upstream control volume with said downstream control volume, the flow passage formed between the upstream control volume and the downstream control volume, all of the upstream control volume being upstream of the flow passage, all of the downstream control volume being downstream of the flow passage;
   a radial contact wall unitary with said support structure within said upstream control volume upstream of the flow passage, said radial contact wall configured to intercept debris entrained within cooling air upstream of the flow passage within the upstream control volume of said high pressure turbine before passing through the flow passage; and
   a stagnation zone fluidly coupled with said flow passage, the stagnation zone being upstream of the flow passage and axially aft of the flow passage, said stagnation zone configured to reduce momentum of said debris.

6. The dirt blocker for a high pressure turbine according to claim 5, further comprising:
   a debris wall formed from said support structure proximate an upstream side, said debris wall being fluidly coupled to a bore formed between said radial contact wall and said debris wall, the debris wall being upstream of the flow passage, said bore in fluid communication with said flow passage.

7. A process for removing debris entrained in a gas turbine engine cooling air flow, the gas turbine engine comprising:
a central longitudinal axis;
a high pressure turbine stage including a high pressure turbine stage vane axially forward of a high pressure turbine stage blade;
a support structure disposed within the gas turbine engine radially outward with respect to the central longitudinal axis from the high pressure turbine stage vane, axially aligned with the high pressure turbine stage vane and axially forward of the high pressure turbine stage blade, said support structure defining and dividing an upstream control volume and a downstream control volume, said downstream control volume being opposite said upstream control volume relative to said support structure, wherein upstream and downstream are with respect to cooling air flow direction,
a flow passage formed radially through an axially extending portion of said support structure, said flow passage formed between and configured to fluidly couple said upstream control volume with said downstream control volume, all of said upstream control volume being upstream of the flow passage, all of the downstream control volume being downstream of the flow passage;
a radial contact wall extending from said support structure within said upstream control volume upstream of the flow passage, said radial contact wall configured to intercept debris entrained within cooling air within said upstream control volume upstream of the flow passage; and
a stagnation zone within said upstream control volume fluidly coupled with said flow passage, the stagnation zone being upstream of the flow passage and axially aft of the flow passage, said stagnation zone configured to reduce momentum of said debris upstream of the flow passage; and
the process for removing debris entrained in the gas turbine engine cooling air flow comprising:
flowing the cooling air through the gas turbine engine;
bisecting a portion of the high pressure turbine stage of said gas turbine engine with the support structure disposed radially outward with respect to the central longitudinal axis from the high pressure turbine stage vane, axially aligned with the high pressure turbine stage vane and axially forward of the high pressure turbine stage blade within said gas turbine engine;
forming the radial contact wall unitary with said support structure in fluid communication with said upstream control volume;
flowing the cooling air into the upstream control volume, said radial contact wall configured to intercept debris entrained within the cooling air;
forming the stagnation zone within the upstream control volume fluidly coupled with said flow passage, said stagnation zone configured to reduce momentum of said debris; and
flowing the cooling air through the flow passage through said support structure, said flow passage fluidly coupling said upstream control volume with said downstream control volume.

8. The process of claim 7, further comprising:
forming a debris wall unitary with said support structure proximate an upstream side; and
fluidly coupling said debris wall to a bore formed between said radial contact wall and said debris wall, said bore in fluid communication with said flow passage.

* * * * *